(12) United States Patent
Cheng et al.

(10) Patent No.: US 11,078,050 B2
(45) Date of Patent: Aug. 3, 2021

(54) SPEED DETECTION DEVICE AND PASSENGER CONVEYER DEVICE

(71) Applicant: Otis Elevator Company, Farmington, CT (US)

(72) Inventors: Lifei Cheng, Zhejiang (CN); Zhaoxia Hu, Zhejiang (CN)

(73) Assignee: OTIS ELEVATOR COMPANY, Farmington, CT (US)

( * ) Notice: Subject to any disclaimer, the term of this patent is extended or adjusted under 35 U.S.C. 154(b) by 212 days.

(21) Appl. No.: 16/283,238

(22) Filed: Feb. 22, 2019

(65) Prior Publication Data

US 2019/0263634 A1    Aug. 29, 2019

(30) Foreign Application Priority Data

Feb. 23, 2018 (CN) .......................... 201810154801.1

(51) Int. Cl.
*G01P 3/02* (2006.01)
*B66B 23/02* (2006.01)
*B66B 27/00* (2006.01)

(52) U.S. Cl.
CPC .............. *B66B 27/00* (2013.01); *B66B 23/02* (2013.01); *G01P 3/02* (2013.01)

(58) Field of Classification Search
CPC ............ G01P 3/02; B66B 23/02; B66B 27/00
See application file for complete search history.

(56) References Cited

U.S. PATENT DOCUMENTS

| 2,105,158 | A | * | 1/1938 | Pearce | ...................... G01P 3/28 73/502 |
| 4,798,003 | A | * | 1/1989 | Haglof | ................... B65H 61/00 33/1 LE |
| 5,052,522 | A | * | 10/1991 | Nakai | ...................... G01P 1/04 187/393 |
| 5,245,760 | A | * | 9/1993 | Smart | ...................... G01B 5/04 33/735 |
| 6,325,179 | B1 | | 12/2001 | Barreiro et al. | |
| 7,195,115 | B2 | | 3/2007 | Depaso | |
| 8,097,192 | B2 | | 1/2012 | Tsuda et al. | |

(Continued)

FOREIGN PATENT DOCUMENTS

| CN | 202296791 U | 7/2012 |
| CN | 103991783 A | 8/2014 |

(Continued)

OTHER PUBLICATIONS

Machine translation of CN 204624945 (Year: 2015).*

(Continued)

*Primary Examiner* — Natalie Huls
(74) *Attorney, Agent, or Firm* — Cantor Colburn LLP

(57) ABSTRACT

A speed monitoring device and a passenger conveying device. The speed monitoring device includes a transmission rotor disposed on a shaft side surface of a shaft of which the speed is to be measured and rotating with rotation of the shaft of which the speed is to be measured; an encoder having an input shaft, the input shaft of the encoder being connected to the transmission rotor and rotating with rotation of the transmission rotor; and a mounting bracket for securing the transmission rotor and the encoder to a position where they are to be mounted.

22 Claims, 9 Drawing Sheets

(56) References Cited

U.S. PATENT DOCUMENTS

| | | | |
|---|---|---|---|
| 9,789,332 B2 | 10/2017 | Liu et al. | |
| 2010/0051403 A1* | 3/2010 | Lai | A63H 29/24 |
| | | | 192/56.61 |
| 2016/0056691 A1* | 2/2016 | Hale | H02K 11/21 |
| | | | 310/68 B |
| 2016/0184731 A1 | 6/2016 | Love et al. | |
| 2018/0188079 A1* | 7/2018 | Ko | G01D 5/34707 |
| 2020/0067386 A1* | 2/2020 | Wang | G01D 5/2497 |

FOREIGN PATENT DOCUMENTS

| | | |
|---|---|---|
| CN | 104370199 A | 2/2015 |
| CN | 204138118 U | 2/2015 |
| CN | 103010920 B | 3/2015 |
| CN | 104743432 A | 7/2015 |
| CN | 204624945 U | 9/2015 |
| CN | 205404598 U | 7/2016 |
| CN | 104340835 B | 12/2016 |
| DE | 19728206 A1 | 1/1999 |
| KR | 20130000237 U | 1/2013 |
| WO | 2017042006 A1 | 3/2017 |

OTHER PUBLICATIONS

European Search Report for application EP 19158597.5, dated Jul. 23, 2019, 7 pages.
Dilts, Steve, "10 Tips for Encoder Measuring Wheel Applications", Encoder Products Company, Mar. 21, 2013, 11 pages.

* cited by examiner

SPEED DETECTION DEVICE AND PASSENGER CONVEYER DEVICE

FOREIGN PRIORITY

This application claims priority to Chinese Patent Application No. 2018/10154801.1, filed Feb. 23, 2018, and all the benefits accruing therefrom under 35 U.S.C. § 119, the contents of which in its entirety are herein incorporated by reference

TECHNICAL FIELD

The present application relates to passenger conveying devices and, more particularly, to a speed monitoring device for a main drive shaft of a passenger conveying device.

BACKGROUND ART

As a tool to facilitate passengers' walking between floors or shorten the walking distance of passengers, passenger conveying devices are very common in daily lives. As an example, it is particularly common to see escalators and elevators generally used between floors of shopping malls and moving walkways generally used in large airports.

For such equipment, in order to ensure the smoothness of transportation, it is necessary to monitor and control its speed. For example, in the case of an escalator, one common method at present is to monitor the rotational speed of the gear of the main drive shaft with two sensors. The frequency of outputting signals in such method is rather low, and it is difficult to meet the speed monitoring requirements under the condition of low speed operation. In addition, another common method is to provide a high-precision encoder for speed monitoring at a shaft end of the main drive shaft of the escalator. Although such method can meet the speed requirements under the both conditions of high speed operation and low speed operation of the escalator, since lubricating oil frequently flows through the encoder and pollutes it, and space at the shaft end is rather small, it is difficult to maintain and service the encoder in the application scenarios.

Therefore, an urgent technical problem to be solved is how to provide a speed monitoring device that can achieve stable monitoring and can be easily maintained in a passenger conveying device.

SUMMARY OF THE INVENTION

The present application is directed to providing a speed monitoring device that is stable in speed measurement and is easy to be maintained when applied to a passenger conveying device.

The present application is also directed to providing a passenger conveying device that is stable in speed measurement and easy to be maintained.

In order to achieve the objective of the present application, according to one aspect of the present application, a speed monitoring device is provided, including a transmission rotor disposed on a shaft side surface of a shaft of which the speed is to be measured and rotating with rotation of the shaft of which the speed is to be measured; an encoder having an input shaft, the input shaft of the encoder being connected to the transmission rotor and rotating with rotation of the transmission rotor; and a mounting bracket for securing the transmission rotor and the encoder to a position where they are to be mounted.

Optionally, the speed monitoring device further includes a positioning portion disposed at a connection position of the input shaft of the encoder and the transmission rotor, for preventing a relative movement between the encoder and the transmission rotor.

Optionally, the transmission rotor has a stepped mounting hole, and the positioning portion includes an elastic plug; wherein a first side of the stepped mounting hole is engaged with the input shaft of the encoder, and the elastic plug is engaged with a second side of the stepped mounting hole and the input shaft of the encoder.

Optionally, the elastic plug is constructed to have a frustoconical body and is provided on a sidewall thereof with a receiving region for providing space for elastic deformation; wherein in a mounted state, one end of the elastic plug having a smaller diameter is toward the stepped mounting hole.

Optionally, the transmission rotor has an outer circumferential surface made of polyurethane and/or a rotor body made of a nylon material.

Optionally, the outer circumferential surface of the transmission rotor is integrally formed with the rotor body.

Optionally, a reinforcing rib is further disposed on a sidewall of the rotor body.

Optionally, the speed monitoring device further includes a friction increasing portion disposed around the shaft of which the speed is to be measured and having an outer circumferential surface that is engaged with the transmission rotor; wherein a static friction coefficient of the outer circumferential surface of the friction increasing portion is larger than a static friction coefficient of the outer circumferential surface of the shaft of which the speed is to be measured.

Optionally, the friction increasing portion includes a retaining ring that is disposed around the shaft of which the speed is to be measured and remains relatively stationary with respect to the shaft of which the speed is to be measured during operation.

Optionally, the retaining ring includes a plurality of retaining segments engaged to one another.

Optionally, each of the plurality of retaining segments has an inclined end surface, and the inclined end surfaces of adjacent retaining segments are engaged with each other.

Optionally, the speed monitoring device further includes a plurality of sets of stepped shafts, each having a first stepped segment and a second stepped segment; a plurality of sets of positioning members; and mounting holes respectively disposed on sidewalls of adjacent retaining segments near ends; wherein in a mounted state, the first stepped segment is engaged with the mounting hole of the retaining segment; the second stepped segment passes through the mounting hole, and the second stepped segment is provided with a fastening hole; the positioning member in each set fastens an adjacent stepped shaft through the fastening hole in the second stepped segment.

Optionally, a convex portion is provided on an inner circumferential surface of the retaining ring, and the retaining ring is in an interference fit with the shaft of which the speed is to be measured through the convex portion.

Optionally, the convex portion is constructed as a strip-shaped boss.

Optionally, the speed monitoring device further includes a pressure bearing bracket, wherein the transmission rotor and the encoder are fixed to the pressure bearing bracket through the mounting bracket; and in an operation state, the pressure bearing bracket is used for providing pressure from the transmission rotor toward the shaft of which the speed is to be measured.

Optionally, the pressure bearing bracket includes a torque fulcrum, an elastic member located on a first side of the torque fulcrum, and a second side opposite to the first side; wherein the transmission rotor and the encoder are connected through the mounting bracket to the pressure bearing bracket at the second side of the torque fulcrum; and the elastic member acts as a source of pressure that presses the transmission rotor against the shaft of which the speed is to be measured.

Optionally, the speed monitoring device further includes an elastic force control portion coupled to the elastic member and configured to control a degree of compression of the elastic member.

Optionally, a window is further disposed on the pressure bearing bracket and is disposed at a connection position of the elastic force control portion and the elastic member for checking a current compression degree of the elastic member.

Optionally, the transmission rotor and the pressure bearing bracket are disposed on an upper side or a lower side of the shaft of which the speed is to be measured.

Optionally, a line connecting circle centers of the transmission rotor and the shaft of which the speed is to be measured is at an angle of 45°-90° with respect to a horizontal plane.

Optionally, the speed monitoring device further includes a shroud; wherein the shroud is disposed on a side of the pressure bearing bracket and the transmission rotor away from the shaft of which the speed is to be measured.

In order to achieve the objective of the present application, according to another aspect of the present application, there is provided a passenger conveying device, including the speed monitoring device as described above, wherein the speed monitoring device is disposed on a shaft side surface of a main drive shaft.

According to the speed monitoring device and the passenger conveying device of the present application, by properly designing the structure of the speed monitoring device and arranging it on the shaft side surface of the main drive shaft, the stability of monitoring the rotational speed of the shaft can be ensured on the one hand, and on the other hand, there is more space reserved around the mounting position for easy maintenance and service.

DETAILED DESCRIPTION

Figure 1:
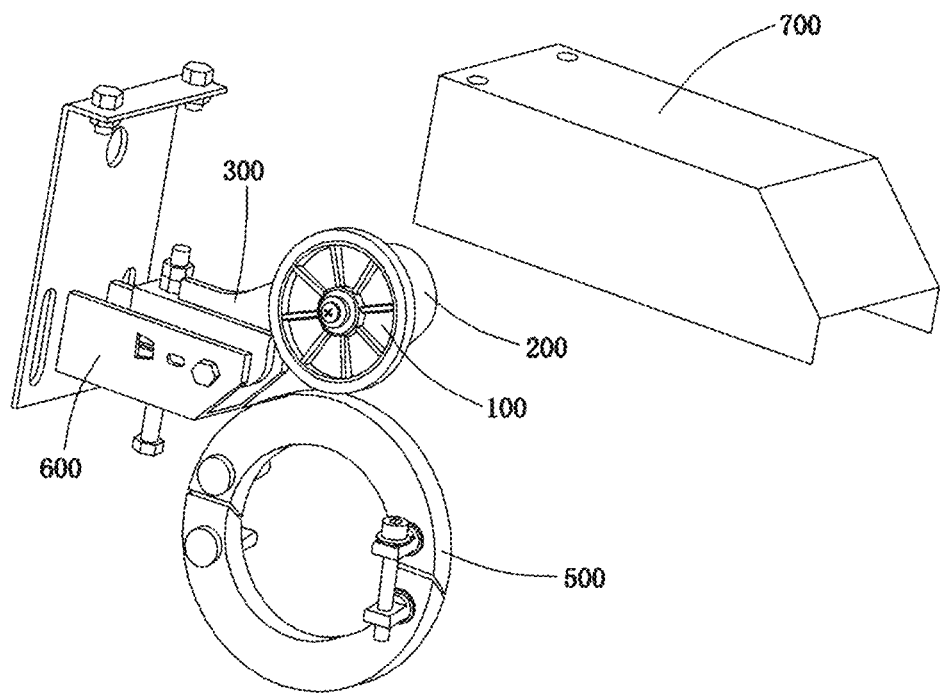
FIG. 1 is a first perspective view of one embodiment of a speed monitoring device of the present application.
Figure 2:
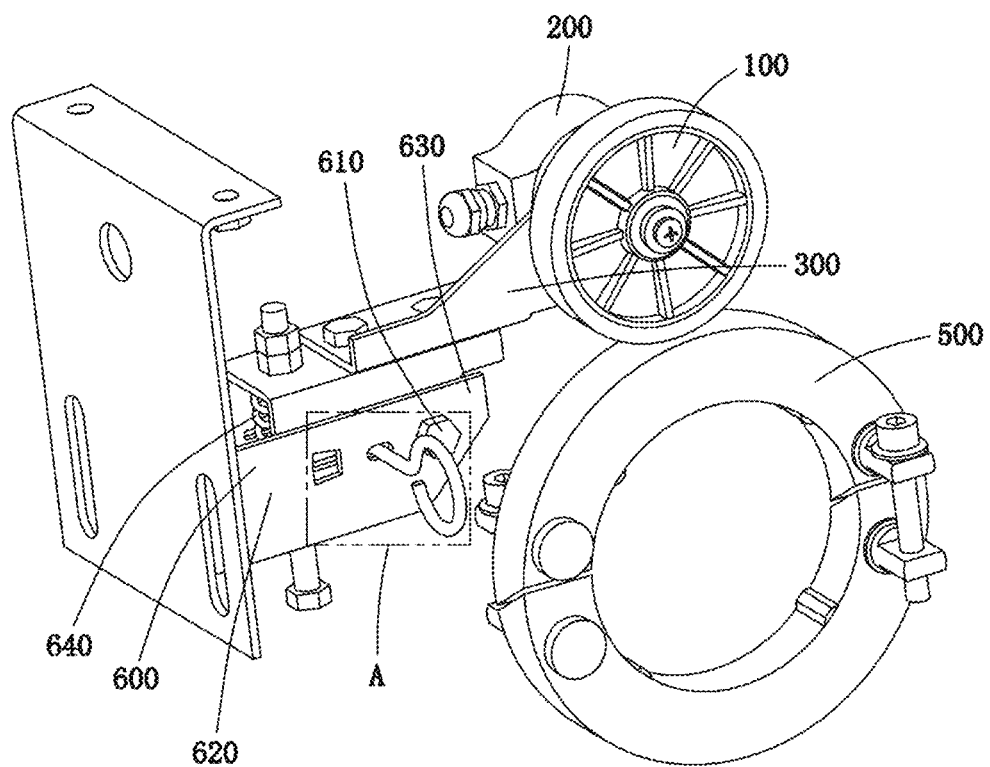
FIG. 2 is a second perspective view of one embodiment of the speed monitoring device of the present application.
Figure 3:
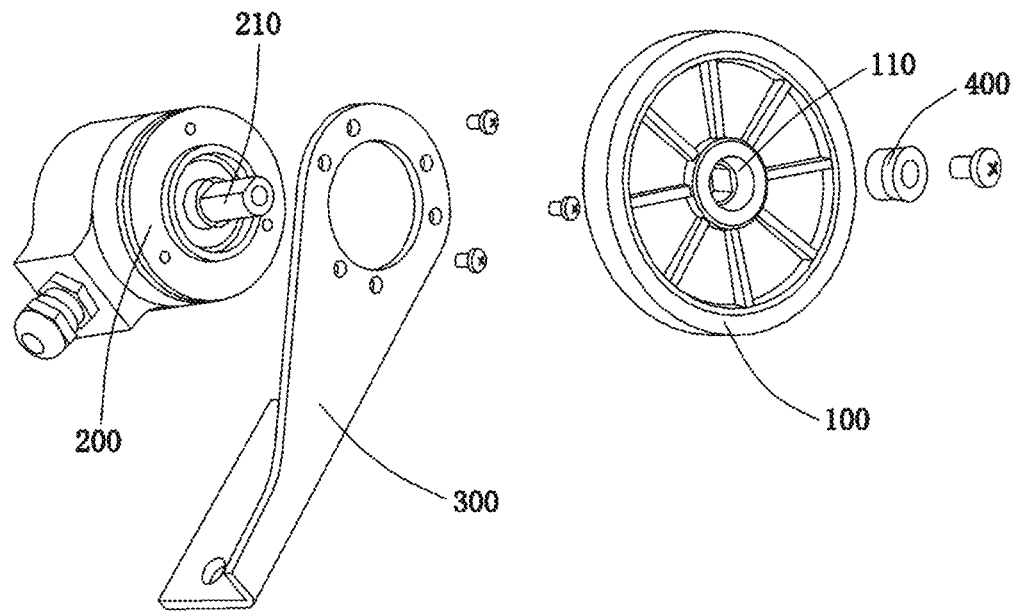
FIG. 3 is a schematic exploded view showing an assembly among an encoder, a transmission rotor and a mounting bracket of one embodiment of the speed monitoring device of the present application.

Referring to FIGS. 1 to 2, a speed monitoring device is shown. The speed monitoring device includes a speed monitoring portion for realizing a speed monitoring function; a friction increasing portion for increasing a static friction force of a contact surface between the speed monitoring portion and a shaft of which the speed is to be measured; a pressure bearing bracket for applying pressure on the speed monitoring portion toward the shaft of which the speed is to be measured; and a shroud portion for preventing the speed monitoring device from being contaminated by falling lubricating oil. The composition and function of each functional portion will be separately explained as follows.

Referring to FIGS. 1 to 6, the speed monitoring portion includes a transmission rotor 100, an encoder 200 and a mounting bracket 300. The conventional encoder is constructed to have a main body portion for encoding and an input shaft for speed measurement, and the input shaft is engaged with a shaft end portion of the shaft of which the speed is to be measured, to enable sensing a rotational motion of the shaft of which the speed is to be measured and performing encoding. In this case, in order to arrange the encoder 200 in a middle position of the shaft of which the speed is to be measured, which presents larger maintenance space, a motion conversion part is required to convert a motion mode of a shaft side surface of the shaft of which the speed is to be measured into a motion mode that the input shaft of the encoder can read. Therefore, the present concept herein provides a transmission rotor 100, which is arranged on the shaft side surface of the shaft of which the speed is to be measured and rotates with the rotation of the shaft of which the speed is to be measured. The input shaft 210 of the encoder 200 is connected to the transmission rotor 100, and rotates with the rotation of the transmission rotor 100. The transmission rotor 100 and the encoder 200 are fixed to a position where they are to be mounted by the mounting bracket 300, thereby achieving assembly thereof.

In such an arrangement, with the transmission rotor, it can achieve an effect of enabling the encoder to monitor a rotational speed on the shaft side surface of the shaft of which the speed is to be measured. On the one hand, the stability of monitoring the rotational speed of the shaft can be ensured, and on the other hand, there is more space reserved around the mounting position for easy maintenance and service.

In addition, since a transmission rotor that functions as motion conversion and transmission is added between the encoder and the shaft of which the speed is to be measured, improving the transmission stability between the two of them and ensuring the accuracy of the speed measurement also require some corresponding devising. This will be illustratively explained as follows.

Referring to FIGS. 3 to 6, the speed monitoring device may further include a positioning portion. Specifically, the positioning portion is arranged at a connection position of the input shaft 210 of the encoder 200 and the transmission rotor 100, and is used to prevent a relative movement between the encoder 200 and the transmission rotor 100. As a specific structural implementation, the positioning portion includes an elastic plug 400, and the transmission rotor 100 has a stepped mounting hole 110.

Figure 4:
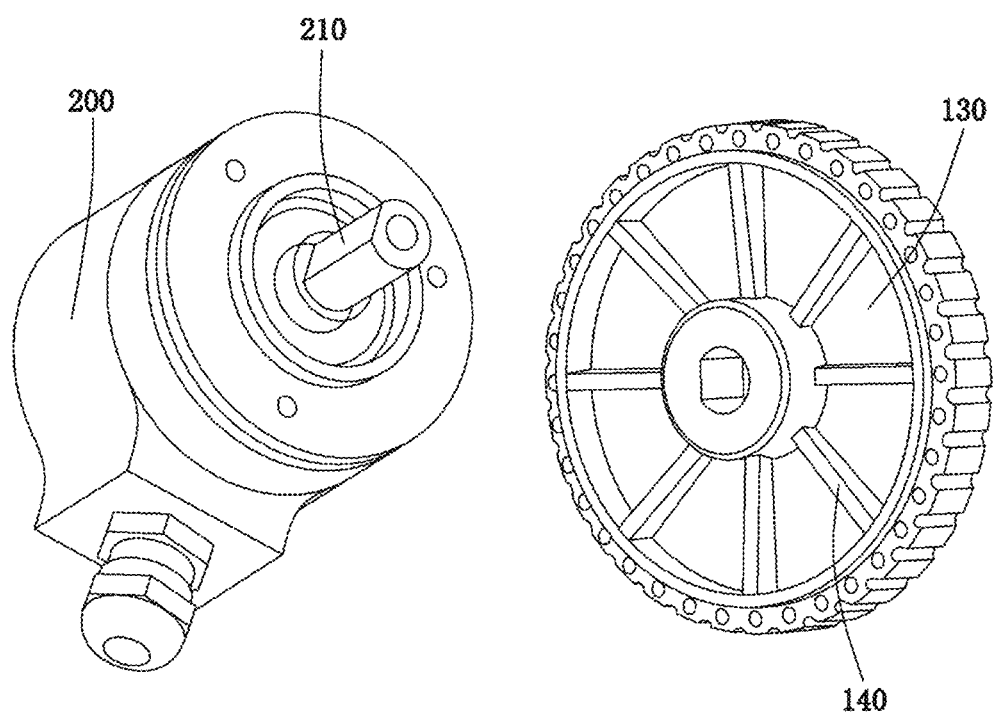
FIG. 4 is a schematic exploded view showing an assembly between the encoder and the transmission rotor of one embodiment of the speed monitoring device of the present application.

Wherein, as shown in FIG. 4, a first side 111 of the stepped mounting hole 110 and the input shaft 210 of the encoder 200 respectively have corresponding engagement planes, so that the two of them can be connected at a specific angle and can be held in places unchanged with respect to each other.

Figure 5:
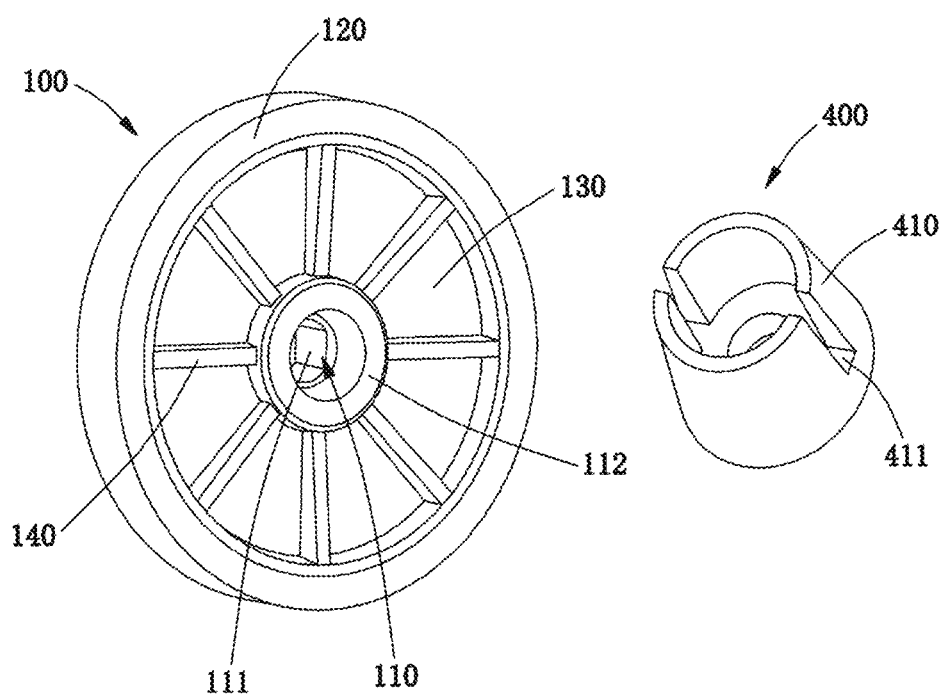
FIG. 5 is a schematic exploded view showing an assembly between the transmission rotor and an elastic plug of one embodiment of the speed monitoring device of the present application.
Figure 6:
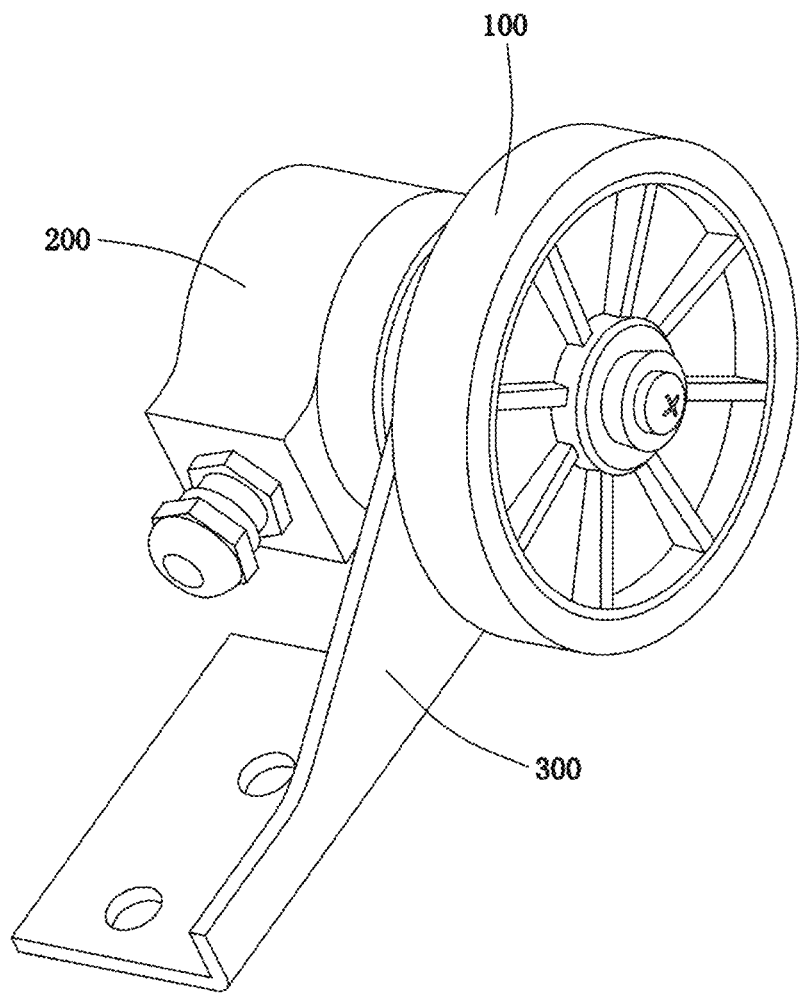
FIG. 6 is a schematic view showing a completed assembly among the encoder, the transmission rotor and the mounting bracket of one embodiment of the speed monitoring device of the present application.

In addition, as shown in FIG. 5, the elastic plug 400 is engaged with a second side 112 of the stepped mounting hole 110 and the input shaft 210 of the encoder 200. Specifically, the elastic plug 400 is constructed to have a frustoconical body and is provided on the sidewall 410 thereof with a receiving region 411 for providing space for elastic deformation. In a mounted state, one end of the elastic plug 400 having a smaller diameter is pressed into the stepped mounting hole 110, and the elastic plug 400 may undergo a large deformation due to its own elastic material characteristics and the preset receiving region. The input shaft of the encoder is tightly pressed against the stepped mounting hole until no relative movement can occur. Finally the fastening of the three is achieved by a bolt. In such an arrangement, motion synchronization between the input shaft of the encoder and the transmission rotor is excellently maintained, almost eliminating the possibility of relative motion between the two of them.

On the other hand, the transmission rotor 100 includes an integrally formed outer circumferential surface 120 made of polyurethane and a rotor body 130 made of a nylon material. In this case, the outer circumferential surface has a great static friction coefficient, which is more difficult for a relative movement to occur when contacting the shaft of which the speed is to be measured. Moreover, the rotor body provides a sufficient structural strength and a wear resistance to ensure the service life of the parts. In such an arrangement, motion synchronization between the transmission rotor and the shaft of which the speed is to be measured is excellently maintained, almost eliminating the possibility of relative motion between the two of them.

Optionally, a reinforcing rib 140 may be additionally disposed on a sidewall of the rotor body 130 to further improve the structural strength thereof.

Furthermore, when the shaft of which the speed is to be measured is a drive shaft of a large workpiece, it is usually a standard drive shaft having a smooth surface. In this case, if the outer circumferential surface of the standard drive shaft is processed to increase the static friction coefficient, it usually has to spend a large amount of cost to modify the corresponding tooling, outweighing the benefit. In this case, if the static friction coefficient of the contact point with the transmission rotor can be increased without changing the shaft of which the speed is to be measured, the requirements of both aspects can be met.

Figure 7:
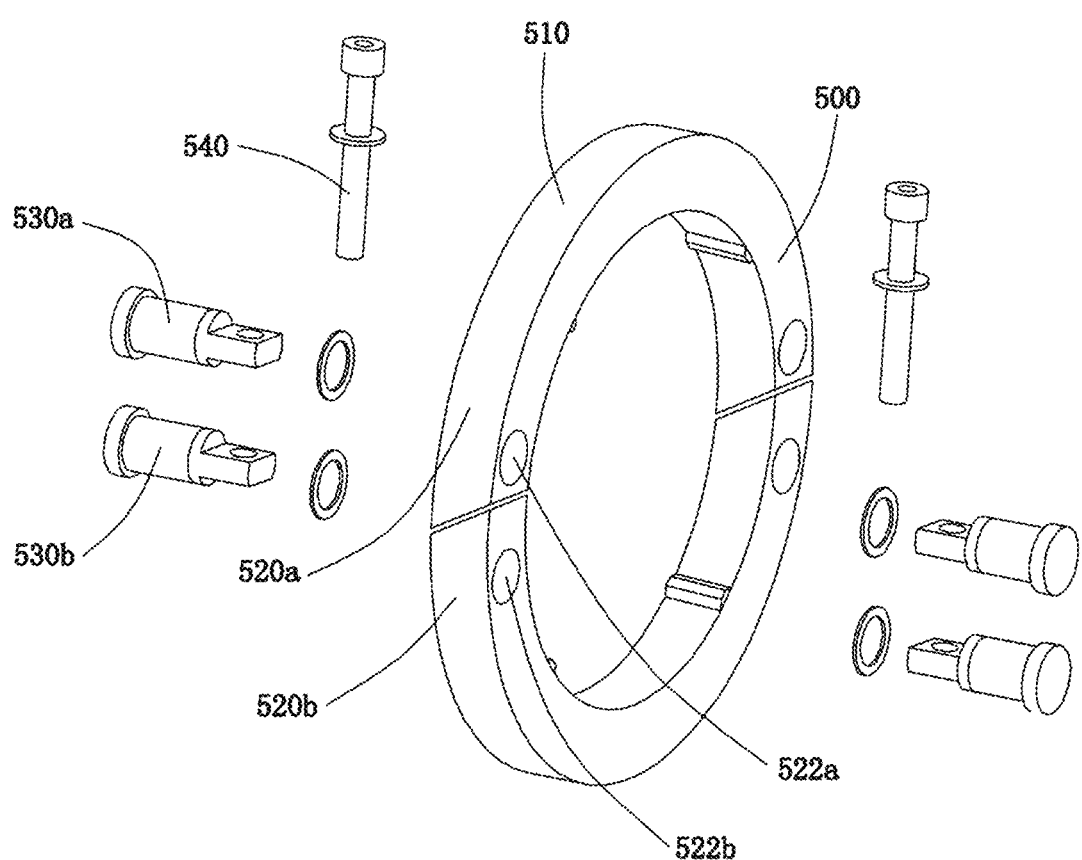
FIG. 7 is a schematic exploded view showing an assembly of a retaining ring of one embodiment of the speed monitoring device of the present application.
Figure 8:
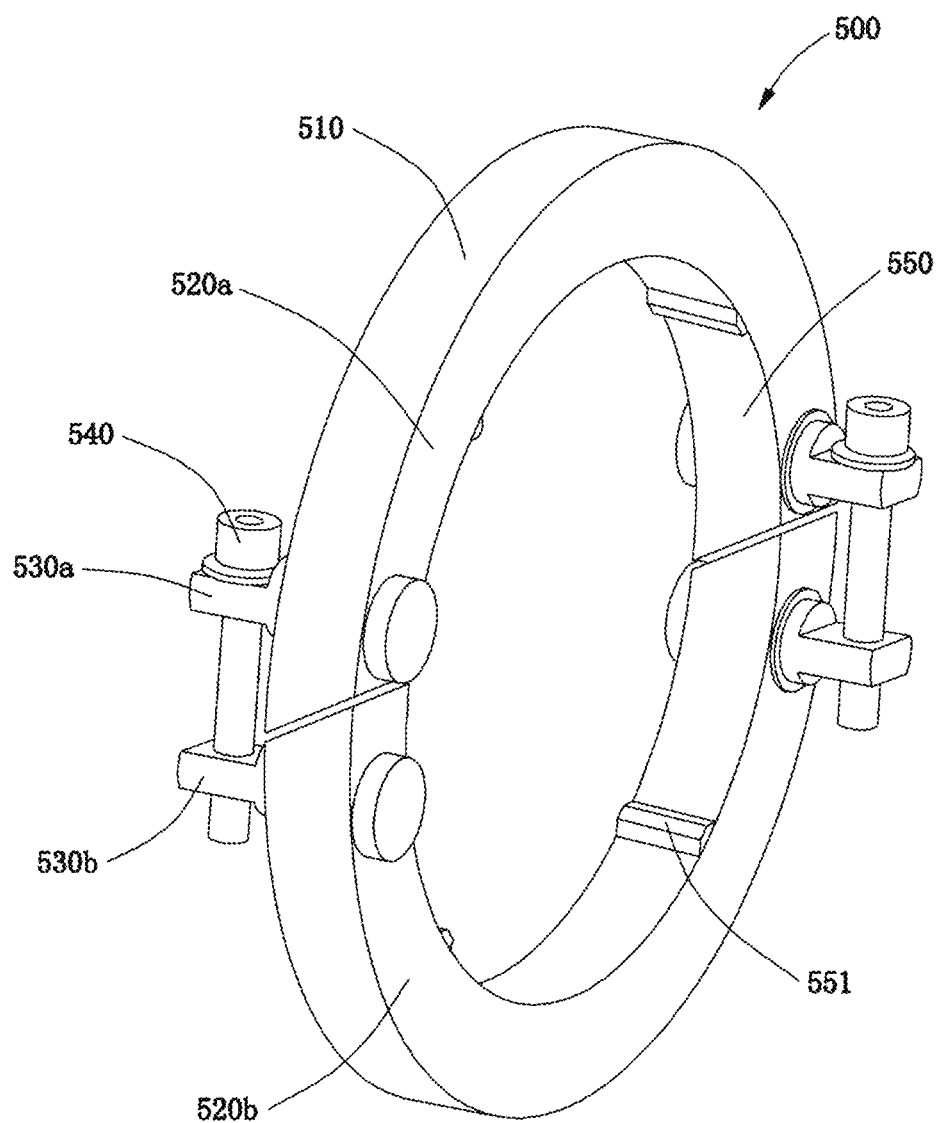
FIG. 8 is a schematic view showing a completed assembly of a retaining ring of one embodiment of the speed monitoring device of the present application.
Figure 9:
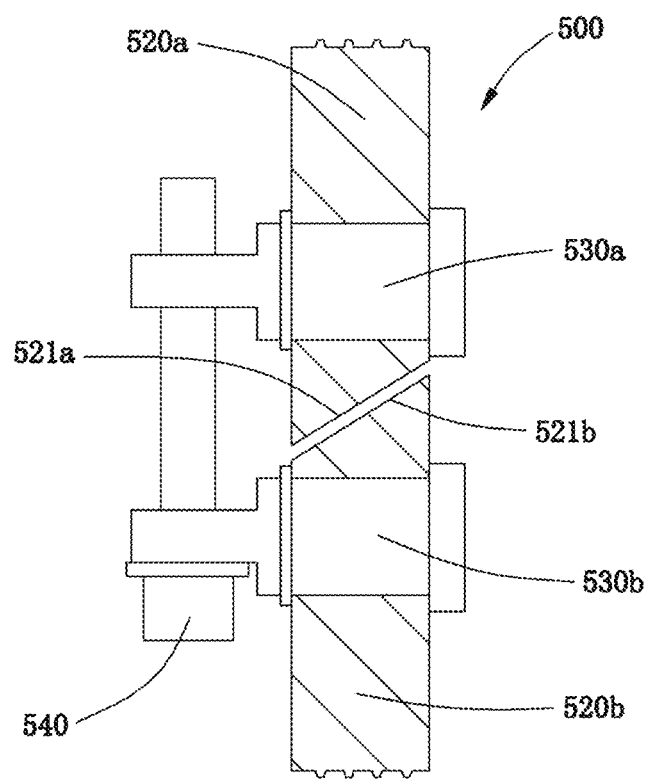
FIG. 9 is a side cross-sectional view showing a completed assembly of the retaining ring of one embodiment of the speed monitoring device of the present application.

Referring to FIGS. 7-9, an embodiment of a friction increasing portion is provided herein. The friction increasing portion is disposed around the shaft of which the speed is to be measured and has an outer circumferential surface 510 that is engaged with the transmission rotor 100. The static friction coefficient of the outer circumferential surface 510 of the friction increasing portion is larger than the static friction coefficient of the outer circumferential surface of the shaft of which the speed is to be measured. In this case, compared to the case where the transmission rotor is directly engaged with the shaft of which the speed is to be measured for transmission, the engagement between the transmission rotor and the friction increasing portion will have a larger static friction force and can also have a lower possibility of relative motion between the two. Therefore, it has better motion synchronization.

As a specific structural implementation, the friction increasing portion may include a retaining ring 500, and the retaining ring 500 is disposed around the shaft of which the speed is to be measured and remains relatively stationary with respect to the shaft of which the speed is to be measured during operation.

Specifically, in order to facilitate the mounting of the retaining ring 500 on the shaft of which the speed is to be measured, it may be configured to include a plurality of retaining segments engaged to one another. For example, two retaining segments 520a and 520b are taken as an example in FIGS. 7 to 9. In this case, it is only necessary to place the retaining segments 520a and 520b respectively on the upper and lower sides of the shaft of which the speed is to be measured, and then close them to complete the mounting. In order to improve the fault tolerance of the assembly process, here, the ends of the two retaining segments 520a, 520b are arranged to respectively have inclined end surfaces. As shown in FIG. 9, the inclined end surfaces 521a, 521b on the same side of the two retaining segments 520a, 520b are engaged to each other, and a clearance can be left in an assemble completed state to facilitate adjustment as appropriate.

A specific fastening manner between the retaining segments is also provided herein. In this case, the device further includes a plurality of sets of stepped shafts, a plurality of sets of positioning members; and mounting holes respectively disposed on sidewalls of the adjacent retaining segments near the ends. Referring to FIG. 7 and FIG. 8, the fastening manner will be described by taking the same side of the two retaining segments as an example. In this case, the set of stepped shafts 530a, 530b each have a first stepped segment and a second stepped segment, and is provided with a fastening hole on the second stepped segment. In the mounted state, the first stepped segments of the stepped shafts 530a, 530b are respectively engaged with the mounting holes 522a, 522b on the retaining segments 520a, 520b; and the second stepped segments of the stepped shafts 530a, 530b pass through the mounting holes 522a, 522b on the retaining segments 520a, 520b. Subsequently, the positioning member 540 passes sequentially through the fastening holes on the second stepped segments of the adjacent stepped shafts 530a, 530b to fasten the two of them. The same operation is performed on the other side not shown in the drawing, thereby realizing the assembly between the retaining ring and the shaft of which the speed is to be measured.

In addition, optionally, in order to ensure that the retaining ring and the shaft of which the speed is to be measured are stationary with respect to each other, a convex portion, for example, a strip-shaped boss 551, is also provided on an inner circumferential surface 550 of the retaining ring 500. The retaining ring 500 presses tightly against the shaft of which the speed is to be measured with the strip-shaped boss 551 to achieve an interference fit with the shaft of which the speed is to be measured.

The synchronous transmission of motion between the encoder, the transmission rotor and the shaft of which the speed is to be measured is mainly based on the static friction at the mutual contact position between the transmission rotor and the shaft of which the speed is to be measured. Therefore, how to apply appropriate pressure between the two to maintain the static friction between the two is also something to be considered.

Figure 10:
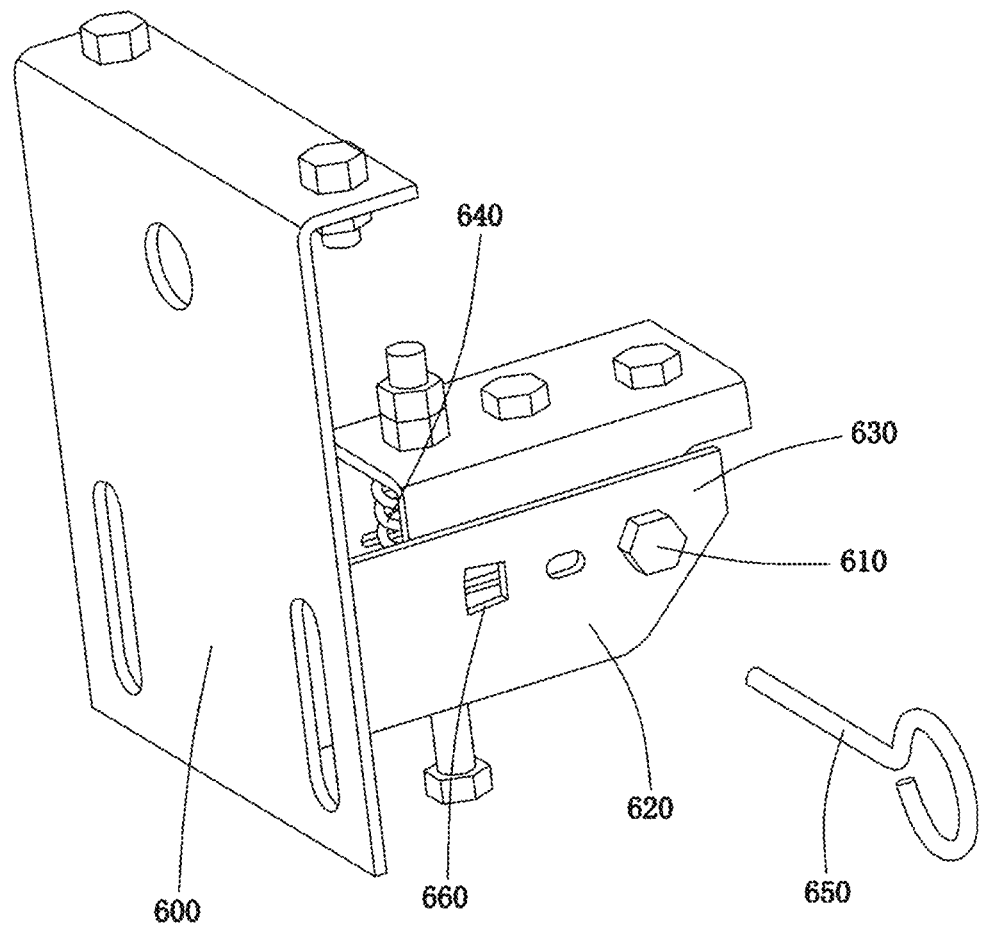
FIG. 10 is a schematic view showing a completed assembly of a pressure bearing bracket of one embodiment of the speed monitoring device of the present application.
Figure 11:
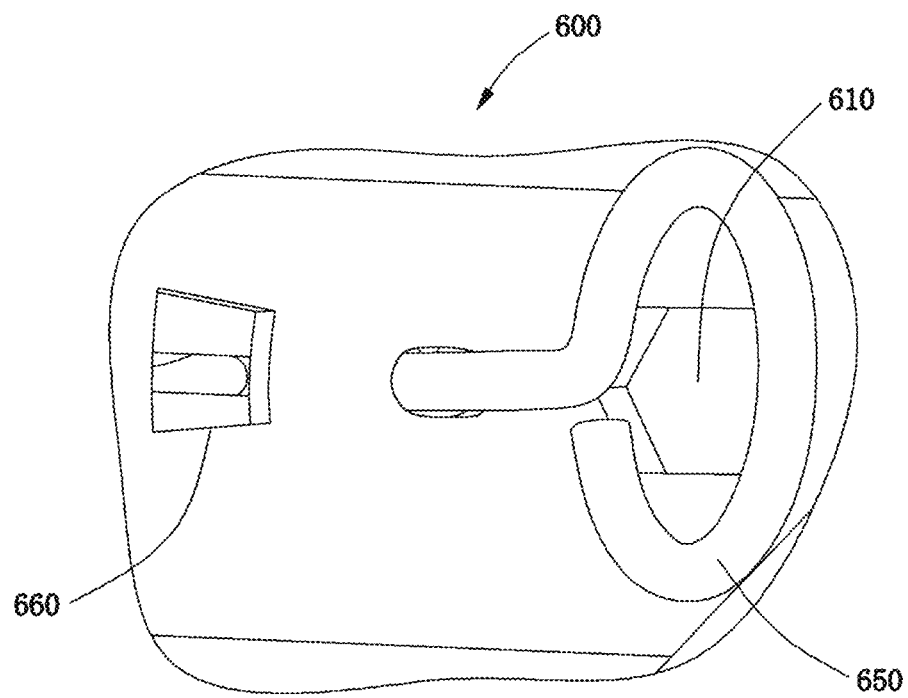
FIG. 11 is a partial enlarged view of a portion A of FIG. 2.

Referring to FIGS. 10-11, the speed monitoring device further includes a pressure bearing bracket 600, and the transmission rotor 100 and the encoder 200 are fixed to the pressure bearing bracket 600 through the mounting bracket 300. In an operation state, the pressure bearing bracket 600 is used to provide pressure from the transmission rotor 100 toward the shaft of which the speed is to be measured. As a specific structural implementation, the pressure bearing bracket 600 includes a torque fulcrum 610, an elastic member 640 at a first side 620 of the torque fulcrum 610, and a second side 630 opposite to the first side 620; wherein the transmission rotor 100 and the encoder 200 are connected through the mounting bracket 300 to the pressure bearing bracket 600 at the second side 630 of the torque fulcrum 610; and the elastic member 640 acts as a source of pressure that presses the transmission rotor 100 against the shaft of which the speed is to be measured. In such an arrangement, the torque that can be brought about by the elastic element 640 is converted into a torque that presses the transmission rotor 100 against the shaft of which the speed is to be measured according to a simple lever principle, thereby ensuring sufficient static friction between the two. The motion synchronization between the transmission rotor and the shaft of which the speed is to be measured is excellently maintained.

Optionally, an elastic force control portion 650, such as a latch coupled to the elastic member 640, may be additionally provided, in consideration of a difference between a factory configuration and an actual application situation, or a change in elastic force of the elastic member with aging. When the assembly is completed, the latch can be screwed according to actual needs, thereby adjusting the length, the degree of twist or the degree of compression of the elastic member 640, thereby adjusting the elastic value finally outputted.

On the basis of this, a window 660 may also be disposed on the pressure bearing bracket 600, which is opened at the connection position of the elastic force control portion 650 and the elastic member 640 for checking a current compression degree of the elastic member 640. A scale may even be correspondingly set on the window for indicating to the operator the elastic value currently provided by the elastic element. Alternatively, for simplification, edges of the window may correspondingly represent upper and lower limits of the elastic value, so that the operator can roughly estimate the elastic value currently provided by the elastic element.

Optionally, although it is shown in the Figure that the transmission rotor 100 and the pressure bearing bracket 600 are all disposed on the upper side of the shaft of which the speed is to be measured, they may be placed on the lower side of the shaft of which the speed is to be measured in practical applications.

Optionally, a line connecting circle centers of the transmission rotor 100 and the shaft of which the speed is to be measured is at an angle of 45°-90° with respect to a horizontal plane. In this case, the component of the force provided by the pressure bearing bracket to the transmission rotor in the direction of the line connecting circle centers of the transmission rotor and the shaft of which the speed is to be measured is relatively large, and this component of the force is an effective guarantee for providing static friction between the two. Therefore, the aforementioned angle is a more suitable setting angle.

On the other hand, referring to FIG. 1, in order to prevent the lubricating oil on the mechanical member above the shaft of which the speed is to be measured from falling due to gravity and contaminating the speed monitoring device, a shroud 700 may be additionally provided. When applied to the embodiment shown in FIG. 1, the shroud is disposed on the side of the pressure bearing bracket 600 and the transmission rotor 100 away from the shaft of which the speed is to be measured, thereby enabling protection of these precision parts.

Figure 12:
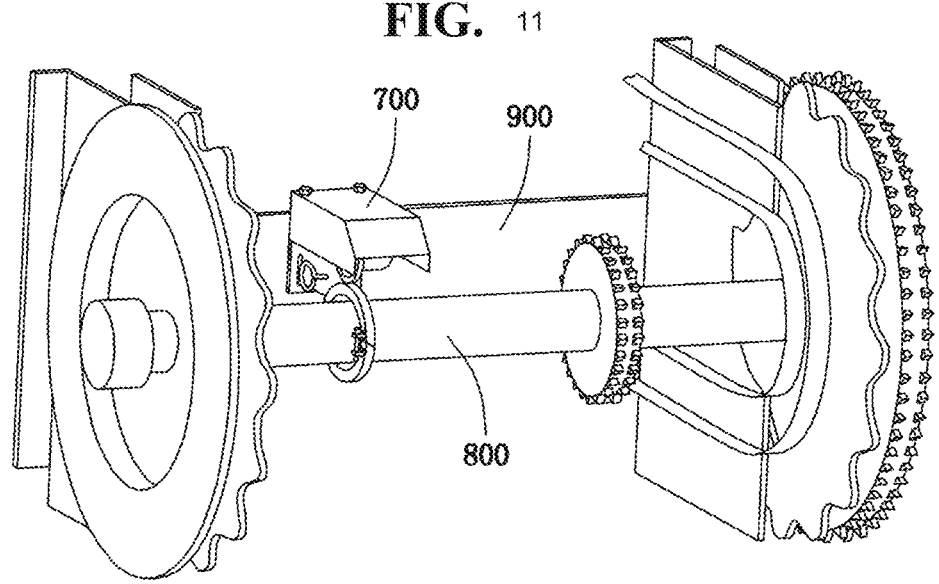
FIG. 12 is a schematic view of one embodiment of a speed monitoring device for a main drive shaft of an escalator of the present application.

According to another aspect of the present application, there is also provided a passenger conveying device. Referring to FIG. 12, a main drive shaft 800 and a truss 900 of the passenger conveying device are shown. The speed monitoring device mentioned in the foregoing embodiment is disposed around the main drive shaft 800, and the pressure bearing bracket thereof is connected to the truss 900 for fixing.

In such an arrangement, with the transmission rotor, it can achieve an effect of enabling the encoder to monitor a rotational speed on the shaft side surface of the main drive shaft of the passenger conveying device. On the one hand, the stability of monitoring the rotational speed of the shaft can be ensured, and on the other hand, there is more space reserved around the mounting position for easy maintenance and service.

The above examples mainly illustrate the speed monitoring device and the passenger conveying device of the present application. Although only a few of the embodiments of the present application have been described, it will be understood by those skilled in the art that the present application can be implemented in many other forms without departing from the spirit and scope thereof. Therefore, the examples and embodiments set forth are to be considered as illustrative and not restrictive, and the present application may cover various modifications and replacements without departing from the spirit and scope of the present application as defined by the appended claims.

What is claimed is:
1. A speed monitoring device comprising:
a transmission rotor disposed on a shaft side surface of a shaft of which the speed is to be measured and rotating with rotation of the shaft of which the speed is to be measured;
an encoder having an input shaft, the input shaft of the encoder being connected to the transmission rotor and rotating with rotation of the transmission rotor;
a mounting bracket for securing the transmission rotor and the encoder to a position where they are to be mounted;

a friction increasing portion disposed around the shaft of which the speed is to be measured and having an outer circumferential surface that is engaged with the transmission rotor.

2. The speed monitoring device according to claim 1, further comprising a positioning portion disposed at a connection position of the input shaft of the encoder and the transmission rotor, for preventing a relative movement between the encoder and the transmission rotor.

3. The speed monitoring device according to claim 1, wherein the transmission rotor has an outer circumferential surface made of polyurethane and/or a rotor body made of a nylon material.

4. The speed monitoring device according to claim 3, wherein the outer circumferential surface of the transmission rotor is integrally formed with the rotor body.

5. The speed monitoring device according to claim 3, wherein a reinforcing rib is further disposed on a sidewall of the rotor body.

6. The speed monitoring device according to claim 1, wherein a static friction coefficient of the outer circumferential surface of the friction increasing portion is larger than a static friction coefficient of the outer circumferential surface of the shaft of which the speed is to be measured.

7. The speed monitoring device according to claim 6, wherein the friction increasing portion comprises a retaining ring that is disposed around the shaft of which the speed is to be measured and remains relatively stationary with respect to the shaft of which the speed is to be measured during operation.

8. The speed monitoring device according to claim 7, wherein the retaining ring comprises a plurality of retaining segments engaged to one another.

9. The speed monitoring device according to claim 8, wherein each of the plurality of retaining segments has an inclined end surface, and the inclined end surfaces of adjacent retaining segments are engaged with each other.

10. The speed monitoring device according to claim 8, further comprising
   a plurality of sets of stepped shafts, each having a first stepped segment and a second stepped segment;
   a plurality of sets of positioning members; and
   mounting holes respectively disposed on sidewalls of adjacent retaining segments near ends;
   wherein in a mounted state, the first stepped segment is engaged with the mounting hole of the retaining segment; the second stepped segment passes through the mounting hole, and the second stepped segment is provided with a fastening hole; the positioning member in each set fastens an adjacent stepped shaft through the fastening hole in the second stepped segment.

11. The speed monitoring device according to claim 7, wherein a convex portion is provided on an inner circumferential surface of the retaining ring, and the retaining ring is in an interference fit with the shaft of which the speed is to be measured through the convex portion.

12. The speed monitoring device according to claim 11, wherein the convex portion is constructed as a strip-shaped boss.

13. The speed monitoring device according to claim 1, further comprising a pressure bearing bracket, wherein the transmission rotor and the encoder are fixed to the pressure bearing bracket through the mounting bracket;
   and in an operation state, the pressure bearing bracket is used for providing pressure from the transmission rotor toward the shaft of which the speed is to be measured.

14. The speed monitoring device according to claim 13, wherein the pressure bearing bracket comprises: a torque fulcrum, an elastic member located on a first side of the torque fulcrum, and a second side opposite to the first side; wherein the transmission rotor and the encoder are connected through the mounting bracket to the pressure bearing bracket at the second side of the torque fulcrum; and the elastic member acts as a source of pressure that presses the transmission rotor against the shaft of which the speed is to be measured.

15. The speed monitoring device according to claim 14, further comprising an elastic force control portion coupled to the elastic member and configured to control a degree of compression of the elastic member.

16. The speed monitoring device according to claim 13, wherein the transmission rotor and the pressure bearing bracket are disposed on an upper side or a lower side of the shaft of which the speed is to be measured.

17. The speed monitoring device according to claim 13, wherein a line connecting circle centers of the transmission rotor and the shaft of which the speed is to be measured is at an angle of 45°-90° with respect to a horizontal plane.

18. The speed monitoring device according to claim 13, further comprising a shroud; wherein the shroud is disposed on a side of the pressure bearing bracket and the transmission rotor away from the shaft of which the speed is to be measured.

19. A passenger conveying device comprising the speed monitoring device according to claim 1, wherein the speed monitoring device is disposed on a shaft side surface of a main drive shaft.

20. A speed monitoring device comprising:
   a transmission rotor disposed on a shaft side surface of a shaft of which the speed is to be measured and rotating with rotation of the shaft of which the speed is to be measured;
   an encoder having an input shaft, the input shaft of the encoder being connected to the transmission rotor and rotating with rotation of the transmission rotor;
   a mounting bracket for securing the transmission rotor and the encoder to a position where they are to be mounted;
   a positioning portion disposed at a connection position of the input shaft of the encoder and the transmission rotor, for preventing a relative movement between the encoder and the transmission rotor;
   wherein the transmission rotor has a stepped mounting hole, and the positioning portion comprises an elastic plug; wherein a first side of the stepped mounting hole is engaged with the input shaft of the encoder, and the elastic plug is engaged with a second side of the stepped mounting hole and the input shaft of the encoder.

21. The speed monitoring device according to claim 20, wherein the elastic plug is constructed to have a frustoconical body and is provided on a sidewall thereof with a receiving region for providing space for elastic deformation; wherein in a mounted state, one end of the elastic plug having a smaller diameter is toward the stepped mounting hole.

22. A speed monitoring device, characterized by comprising:
   a transmission rotor disposed on a shaft side surface of a shaft of which the speed is to be measured and rotating with rotation of the shaft of which the speed is to be measured;

an encoder having an input shaft, the input shaft of the encoder being connected to the transmission rotor and rotating with rotation of the transmission rotor;

a mounting bracket for securing the transmission rotor and the encoder to a position where they are to be mounted;

a pressure bearing bracket, wherein the transmission rotor and the encoder are fixed to the pressure bearing bracket through the mounting bracket; and in an operation state, the pressure bearing bracket is used for providing pressure from the transmission rotor toward the shaft of which the speed is to be measured;

the pressure bearing bracket including a torque fulcrum, an elastic member located on a first side of the torque fulcrum, and a second side opposite to the first side, wherein the transmission rotor and the encoder are connected through the mounting bracket to the pressure bearing bracket at the second side of the torque fulcrum and the elastic member acts as a source of pressure that presses the transmission rotor against the shaft of which the speed is to be measured;

an elastic force control portion coupled to the elastic member and configured to control a degree of compression of the elastic member;

wherein a window is further disposed on the pressure bearing bracket and is disposed at a connection position of the elastic force control portion and the elastic member for checking a current compression degree of the elastic member.

\* \* \* \* \*